United States Patent Office 3,423,187
Patented Jan. 21, 1969

3,423,187
PROCESS FOR REMOVING ALKALI METAL SULFATES FROM ALKALI METAL HYDROXIDE SOLUTIONS
Robert D. Goodenough and James A. Kelly, Midland, Mich., assignors to The Dow Chemical Company, Midland, Mich., a corporation of Delaware
No Drawing. Continuation-in-part of application Ser. No. 400,910, Oct. 1, 1964. This application July 31, 1967, Ser. No. 657,060
U.S. Cl. 23—296          6 Claims
Int. Cl. C01d 1/28

ABSTRACT OF THE DISCLOSURE

This invention relates to purification of alkali metal hydroxide solutions, such as sodium hydroxide and potassium hydroxide solutions. More specifically, the invention is directed to removal of alkali metal sulfates, such as sodium sulfate and potassium sulfate, from aqueous solutions of the corresponding alkali metal hydroxides by precipitation with ammonia.

---

This application is a continuation-in-part of our U.S. application Ser. No. 400,910, filed Oct. 1, 1964, now abandoned.

Sodium hydroxide (caustic soda) is generally produced by the electrolysis of salt brines, i.e. sodium chloride solutions, in a conventional diaphragm electrolytic cell. Such solutions generally contain a substantial amount of sodium chloride and sodium sulfate as contaminating impurities. For example, a typical cell effluent caustic solution will contain about 8–12 percent NaOH, about 17 percent NaCl, about 1–2 percent $Na_2SO_4$ and the balance as water. The sodium sulfate in the caustic solution is not affected by the electrolytic action taking place in the cell and will thus remain in the solution and continue to build up during each recycle of the caustic solution through the cell. This accumulation is extremely undesirable in that the sodium sulfate has a deteriorative effect on the graphite electrodes in the cell.

Various procedures for removing sodium sulfate from sodium hydroxide solutions have been used in the past. One such procedure involves directing the cell effluent caustic to a series of evaporator tanks where the solution is concentrated by steam evaporation to a point (about 20–35 percent concentration of sodium hydroxide) where both the sodium chloride and sodium sulfate will crystallize out of solution. The resulting slurry is directed to a flat bed filter where the mother liquor is extracted under vacuum and the remaining salt mass is washed and purged with water to separate the sodium chloride from the sodium sulfate so that the chloride solution may be recycled through the system.

In another method for separating sodium sulfate from a sodium hydroxide solution, which is generally referred to as polythermal precipitation, the hot caustic cell effluent solution (about 20–35 percent concentration of sodium hydroxide) is directed from an evaporator to a heat exchanger where it is cooled to about 0° C. At this temperature and concentration, a portion of the sodium sulfate will precipitate out of solution as sodium sulfate decahydrate ($Na_2SO_4 \cdot 10H_2O$). The solution remaining after the first precipitation is recycled back to the evaporator for further concentration and returned to the heat exchanger where it is again cooled to precipitate additional sodium sulfate.

The primary disadvantage of the aforementioned procedures is that they involve a series of time-consuming steps and a substantial amount of costly equipment. To make the production of sodium hydroxide commercially feasible, therefore, a genuine need exists for a simpler and more efficient method for removing the sodium sulfate impurity.

Accordingly, it is a principal object of the present invention to provide a simple, efficient and economical method for purification of an alkali metal hydroxide solution.

A more specific object of this invention is to provide a method for removing substantially all of the sodium sulfate from an electrolytic cell effluent caustic solution to minimize deterioration of the cell equipment.

Other objects and advantages of this invention will become apparent from reference to the following detailed disclosure and description.

Broadly, the present invention resides in the discovery that a substantial portion of the alkali metal sulfate, particularly sodium or potassium sulfate, which is present in electrolytic cell effluent solutions of sodium or potassium hydroxide, may be effectively removed from such solutions by precipitation with anhydrous ammonia in either a gaseous or a liquid form. The sulfate precipitate may be separated from the solution in any convenient manner, as for example, by filtration. Specifically, we have found that addition of liquid or gaseous ammonia to a sodium hydroxide solution containing from about 0.1 to about 50 weight percent sodium hydroxide and from about 0.02 weight percent sodium sulfate up to that amount required to saturate the solution, will effectively precipitate substantially all of the sulfate out of solution. To attain the desired precipitation, the ammonia is dissolved in the caustic solution in a concentration of from about 0.5 to about 30 weight percent, based on the total weight of the ammonia-alkali metal hydroxide mixture. Although the temperature range in which the present method may be carried out is not critical, it is preferred to conduct the reaction at temperatures ranging from about 0° C. to about 200° C. With regard to pressure, it is preferred to operate at the autogenous pressure as generated by the system itself to assure that the ammonia remains dissolved in the sodium hydroxide solution, thereby providing a homogenous aqueous ammonia-caustic solution comprising a single liquid phase. As those skilled in the art will appreciate, the pressure factor is of particular importance when the present method is employed in purifying the more concentrated caustic solutions in which ammonia is known to exhibit a relatively low solubility at atmospheric pressure.

Salts other than sodium chloride, such as sodium bromide and sodium iodide, are generally present in trace amounts in cell effluent solutions of sodium hydroxide. In the practice of this invention, however, we have found that such salts do not detrimentally affect the separation of sodium sulfate from the caustic solution.

Although the preferred embodiment of this invention is directed primarily to the separation of sodium sulfate from a sodium hydroxide solution, it is contemplated that the present method would also be useful in the purification of a potassium hydroxide solution by removal of the potassium sulfate impurity therein. The reaction conditions for separating potassium sulfate from potassium hydroxide would be essentially those as described herein.

The following examples serve to illustrate the present invention but are not to be construed in a limitative sense.

Example I

The caustic solution of this example was an aqueous solution of sodium hydroxide weighing about 800 grams and having the following composition:

| | Weight percent |
|---|---|
| Sodium chloride | 18.96 |
| Sodium hydroxide | 6.80 |
| Sodium sulfate | 1.06 |
| Water, balance to | 100 |

The solution was charged to a conventional autoclave pressure vessel which was packed in a bath of crushed ice. Anhydrous gaseous ammonia was then bubbled into the solution until about 200 grams of ammonia had dissolved in the solution, to give an ammonia concentration of about 25 weight percent, based on the weight of the ammonia-caustic mixture. The internal temperature of the closed vessel was raised to about 100° C. by placing the vessel in a hot water bath. With the increase in temperature the internal pressure in the vessel rose to about 100–150 p.s.i.

The aforementioned temperature and pressure were maintained constant for about 5 minutes to attain a continuous precipitation of the sodium sulfate from the solution. The vessel was then cooled to room temperature by re-immersing it in the ice bath. After cooling, the vessel was opened to visually observe the sodium sulfate precipitate and the ammonia-caustic solution was filtered through a Buchner funnel to collect the precipitate. The unwashed filter cake was dried in an oven at about 110° C. for about 60 minutes and the dried material was weighed in a glass-stoppered weigh bottle.

The dried cake, which weighed about 6 grams, was analyzed and found to contain about 3.32 weight percent NaCl, about 0.68 weight percent NaOH and about 96.13 weight percent $Na_2SO_4$. The $Na_2SO_4$ content in the dried material, therefore, represents about 68 weight percent of that which was originally present in the caustic solution.

Example II

The sodium hydroxide solution of this example weighed about 100 grams and had the following composition:

| | Weight percent |
|---|---|
| Sodium chloride | 12.50 |
| Sodium hydroxide | 17.50 |
| Sodium sulfate | 1.96 |
| Water, balance to | 100 |

Following the procedure of Example I, about 32.8 grams gaseous anhydrous ammonia was dissolved in the caustic solution, as contained in a pressure vessel, to give an ammonia concentration of about 25 weight percent, based on the weight of the ammonia-caustic mixture. The internal temperature of the pressure vessel was maintained at about 60° C. and the pressure at about 65 p.s.i. After sufficient time had elapsed for the $Na_2SO_4$ to precipitate, the ammoniated solution was filtered to remove the precipitate and the filtrate was analyzed volumetrically for sulfate content. The filtrate was found to contain about 0.037 weight percent $Na_2SO_4$, which indicated that about 97.5 weight percent of the $Na_2SO_4$ originally present in the caustic solution had precipitated out.

Example III

The sodium hydroxide solution of this example was a water-urged caustic liquor weighing about 1798 grams and having the following composition:

| | Weight percent |
|---|---|
| Sodium chloride | 22.10 |
| Sodium hydroxide | 0.25 |
| Sodium sulfate | 5.10 |
| Water, balance to | 100 |

To this solution was added about 18.7 ml. (22.0 grams) of 6 N $H_2SO_4$ until it was neutral (about pH 9.5) to a phenol-phthalein solution. This was done to lower the alkalinity of the caustic solution as required for recycle back to the diaphragm cell.

Following the procedure of Example I, about 218 grams gaseous anhydrous ammonia was dissolved in the solution, as contained in a pressure vessel, to give an ammonia concentration of about 10.68 weight percent, based on the weight of the ammonia-caustic mixture. The internal temperature of the vessel was brought up to about 60° C. and held at this temperature for about 30 minutes to precipitate the sodium sulfate. The ammoniated solution was filtered to remove the precipitate and the filtrate was analyzed volumetrically for sulfate content. The filtrate was found to contain about 1.71 weight percent $Na_2SO_4$, which indicated that about 66.7 weight percent of the $Na_2SO_4$ originally present in the caustic solution had precipitated out.

In summary, this invention relates to the purification of aqueous solutions of alkali metal hydroxides, such as sodium and potassium hydroxides, by removal of contaminating alkali metal sulfates, such as sodium and potassium sulfates, from such solutions. The sulfates are removed from such solutions by precipitation with an anhydrous liquid or gaseous ammonia. The preferred sodium or potassium concentration of the hydroxide solution should be from about 0.1 to about 50 weight percent and the sulfate content should be from about 0.02 weight percent up to that amount required to saturate the solution. The concentration of ammonia in the hydroxide solution should be from about 0.5 to about 30 weight percent, based on the total weight of the ammonia-hydroxide mixture.

What is claimed is:

1. In the purification of an aqueous solution of an alkali metal hydroxide selected from the group consisting of sodium hydroxide and potassium hydroxide, by treating the aqueous solution with ammonia to remove an alkali metal sulfate impurity therein, the improvement which comprises, (1) adding anhydrous ammonia to an alkali metal hydroxide solution containing an alkali metal sulfate impurity to provide an ammonia concentration of from about 0.5 to 30 weight percent, based on the total weight of the ammonia-alkali metal hydroxide mixture, and wherein the concentration of alkali metal hydroxide in the solution is from about 0.1 to 50 weight percent, (2) maintaining the resulting ammonia-alkali metal hydroxide solution at a temperature of from about 0° C. to 200° C. and at the autogenous pressure of the solution, thereby to provide a single phase solution of the ammonia dissolved in the alkali metal hydroxide solution and a precipitate of the alkali metal sulfate, and (3) separating the alkali metal sulfate precipitate from the ammonia-alkali metal hydroxide solution.

2. The method of claim 1 in which the anhydrous ammonia is selected from the group consisting of gaseous ammonia and liquid ammonia.

3. The method of claim 1 in which the alkali metal sulfate content of the hydroxide solution is from about 0.02 weight percent up to that amount required to saturate the solution.

4. The method of claim 1 in which the temperature is maintained at from about 60° C. to 100° C.

5. The method of claim 1 in which the alkali metal hydroxide is sodium hydroxide and the alkali metal sulfate is sodium sulfate.

6. The method of claim 1 in which the alkali metal hydroxide is potassium hydroxide and the alkali metal sulfate is potassium sulfate.

References Cited

UNITED STATES PATENTS

| 1,510,046 | 9/1924 | Dolbear | 23—296 |
| 2,138,347 | 11/1938 | Law et al. | 23—184 |
| 2,196,595 | 4/1940 | Muskat | 23—184 |

EDWARD J. MEROS, Primary Examiner.

U.S. Cl. X.R.

23—184, 300, 302